US006736419B2

(12) United States Patent
Carlstedt et al.

(10) Patent No.: US 6,736,419 B2
(45) Date of Patent: May 18, 2004

(54) VEHICLE SUSPENSION SYSTEM USING VISCOUS TENSION DAMPERS

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, Jr., St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 93 days.

(21) Appl. No.: 09/993,430

(22) Filed: Nov. 6, 2001

(65) Prior Publication Data

US 2003/0085542 A1 May 8, 2003

(51) Int. Cl.[7] .............................................. B60G 21/05
(52) U.S. Cl. .................... 280/124.106; 280/124.107; 280/5.508; 188/282.1; 267/73
(58) Field of Search .................. 280/124.106, 124.107, 280/5.508, 5.51, 5.512; 188/280, 282.1, 317; 267/73, 124, 249, 256

(56) References Cited

U.S. PATENT DOCUMENTS

| 2,794,651 | A |   | 6/1957  | Kolbe                |
|-----------|---|---|---------|----------------------|
| 2,859,047 | A |   | 11/1958 | Easton               |
| 2,950,122 | A | * | 8/1960  | Erickson ...... 280/104 |
| 2,969,246 | A | * | 1/1961  | Erickson ...... 280/5.513 |
| 3,397,895 | A | * | 8/1968  | Kuniskis ...... 280/124.107 |
| 3,896,908 | A | * | 7/1975  | Petrak ...... 188/280 |
| 4,042,258 | A |   | 8/1977  | Cislo                |
| 4,484,765 | A |   | 11/1984 | Appelblatt et al.    |
| 4,503,951 | A | * | 3/1985  | Imaizumi ...... 188/280 |
| 4,566,555 | A |   | 1/1986  | Schlanger            |
| 4,628,666 | A |   | 12/1986 | Lems                 |
| 4,632,422 | A |   | 12/1986 | Csordas et al.       |
| 4,664,408 | A |   | 5/1987  | Saotome et al.       |
| 4,943,037 | A |   | 7/1990  | Brodersen et al.     |
| 5,018,700 | A |   | 5/1991  | Hardtke              |
| 5,125,631 | A |   | 6/1992  | Brodersen et al.     |
| 5,230,529 | A | * | 7/1993  | Harvey-Bailey ...... 280/5.508 |
| 5,310,200 | A |   | 5/1994  | MacIsaac             |
| 5,382,034 | A |   | 1/1995  | Parker et al.        |
| 5,478,103 | A |   | 12/1995 | Maeda et al.         |
| 5,542,702 | A |   | 8/1996  | Green et al.         |
| 5,641,175 | A |   | 6/1997  | Maeda et al.         |
| 5,685,527 | A |   | 11/1997 | Harbali et al.       |
| 5,732,969 | A |   | 3/1998  | Spoto                |
| 5,803,474 | A |   | 9/1998  | Klas et al.          |
| 5,813,698 | A |   | 9/1998  | Spoto et al.         |
| 5,836,598 | A |   | 11/1998 | Parker et al.        |
| 5,836,606 | A |   | 11/1998 | Spoto et al.         |
| 5,839,742 | A |   | 11/1998 | Holt                 |
| 6,059,276 | A |   | 5/2000  | Dutzi et al.         |

FOREIGN PATENT DOCUMENTS

JP          405059703 A  *  3/1993

* cited by examiner

Primary Examiner—Paul N. Dickson
Assistant Examiner—George D Spisich
(74) Attorney, Agent, or Firm—Carlson, Gaskey & Olds

(57) ABSTRACT

A pair of tension cables are positioned around cams attached to the lower control arms of a vehicle suspension. Each tension cable includes a tension damper responsive to tension in the tension cables. Each tension damper includes a cylinder containing a fluid and a piston including at least one orifice attached to a rod. The piston divides the cylinder into a first and second compartment. The rod in connected to the tension cable. When the tension cable pulls on one end of the rod, the piston is pulled towards the tension cable. The fluid creates resistance in the tension damper as the fluid moves through the orifice from one compartment to the other compartment, damping vehicle roll. Control of the tension dampers can be passive, semi-active, or active.

20 Claims, 2 Drawing Sheets

VEHICLE SUSPENSION SYSTEM USING VISCOUS TENSION DAMPERS

BACKGROUND OF THE INVENTION

The present invention relates generally to a vehicle suspension system including viscously activated tension dampers employed on tension cables to dampen the roll of a vehicle.

Vehicles are commonly equipped with suspension systems for absorbing road shock and other vibrations, while providing for a smooth and comfortable ride. A suspension component, such as a stabilizer bar, is often used to increase roll rigidity and improve the steering stability of the vehicle. The stabilizer bar is generally attached to the lower control arms of the suspension system to control sway as the vehicle turns.

As a vehicle turns, the body of the vehicle rolls to the outside of the turn. The suspension components on the outside of the turn are generally compressed, while the suspension components on the inside of the turn are generally extended. The stabilizer bar counters this motion by pushing up on the suspension components collapsed through torsion in the stabilizer bar, leveling the vehicle.

One drawback to prior art stabilizer bars is the "deadband" area at the transition point where the suspension moves from one direction to the other. The stabilizer bar acts as a spring to assist in returning the vehicle to a level position. However, if there is not sufficient damping in the suspension, the stabilizer bar tends to overshoot the level position. Damping is commonly added to the shock absorbers or struts to counteract this roll. However, a drawback to adding more damping is that harshness is introduced into the ride of the vehicle.

In prior vehicle suspension systems, a constant tension damper which is not viscously dampened is used on tension cables positioned in the vehicle suspension system. As suspension members, such as lower control arms, rotate, a slider in the tension damper compresses a compressible member in response to tension in the tension cable to dampen vehicle roll. Additionally, in the prior systems, each of the tension cables attach at the bottom of one suspension member and attach at the top of the opposing suspension member on the opposite side of the vehicle. One drawback to this arrangement is that it is not practical on most of today's suspensions.

Hence, there is a need in the art for an improved vehicle suspension system using viscous tension dampers employed on intersecting tension cables.

SUMMARY OF THE INVENTION

This invention relates to a vehicle suspension system using viscous tension dampers employed on intersecting tension cables.

The vehicle suspension system of the present invention includes a first and a second lower control arm, each rotatable about a pivot point. A pair of tension cables positioned around cams are attached to each of the lower control arms and pivot with the cams at the pivot points. The pair of tension cables are each attached to a first and a second attachment point, a cable axis passing through both of the attachment points. A first tension cable attaches at the first attachment point on the first lower control arm, passes on a first side of the cable axis, crosses over to an opposing second side of the cable axis, and attaches at a second attachment point on the second lower control arm. The second tension cable attaches at the first attachment point, passes on the second side of the cable axis, crosses over to the first side of the cable axis, and attaches at the second attachment point. A tension damper is employed on each of the tensions cables and react in response to tension applied to the respective tension cables as the control arms rotate about the pivot points in response to vehicle roll to dampen the roll of the vehicle.

In the preferred embodiment, each tension damper includes a cylinder containing a fluid and a piston including at least one orifice attached to a rod. A first side of the tension cable is attached to the rod, and a second side of the tension cable is attached to the cylinder. The piston divides the cylinder into a first compartment and a second compartment. As the vehicle turns, the control arms and cams pivot about the pivot point, increasing the tension in one of the tension cables. As tension increase, the tension cable pulls on the rod and the attached piston. As fluid is contained in the cylinder, the fluid creates resistance to the movement of the piston. As the tension cable continues to pull, fluid is directed through the orifice from one compartment to the other compartment, damping the roll of the vehicle. A spring mechanism returns the tension damper to the original position after the vehicle is leveled.

Alternatively, the fluid can be either electro-rheological or magnetic-rheological. In this embodiment, a sensor detects when the roll of the vehicle needs to be controlled. The sensor generates a signal in response to this signal, applying either an electric or magnetic field to the fluid to increase fluid viscosity and providing additional resistance in the tension damper.

In another embodiment, the tension damper actively controls damping. The sensor generates a signal which controls both the number and the size of the orifices in the piston.

Accordingly, the present invention provides a vehicle suspension system using tension dampers employed on intersecting tension cables.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
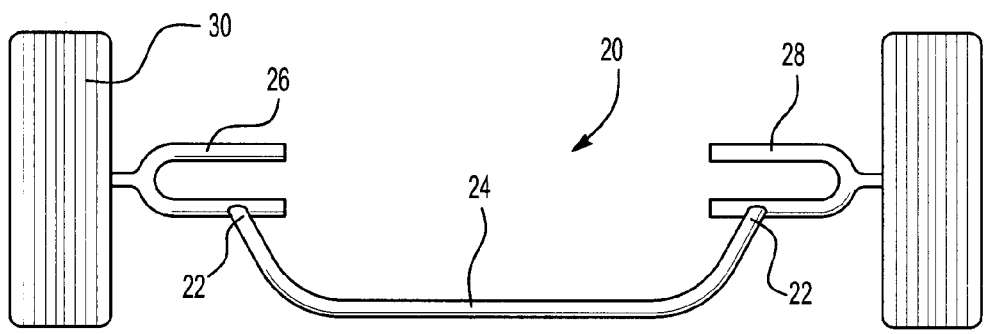
FIG. 1 illustrates a schematic view of a prior art vehicle suspension system.

FIG. 1 illustrates a prior art vehicle suspension system 20. As shown schematically, ends 22 of a stabilizer bar 24 are attached to control arms 26 and 28 which are connected to wheels 30. As known, the stabilizer bar 24 provides a stabilizer function.

Figure 2:
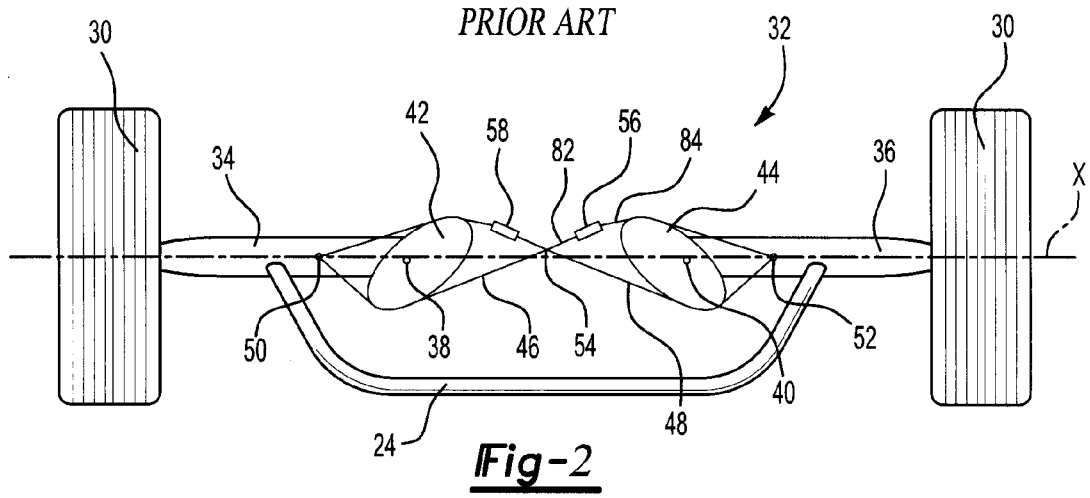
FIG. 2 illustrates a front view of the vehicle suspension system of the present invention.

In the present invention, illustrated in FIG. 2, the vehicle suspension system 32 includes a stabilizer bar 24 attached to a first and second lower control arm 34 and 36, respectively, which are rotatable about pivot points 38 and 40, respectively. A first and a second cam 42 and 44, respectively, are attached to the first and second lower control arms 36 and 38 and pivot with the cams 42 and 44 at the pivot points 38 and 40.

A first and second tension cables 46 and 48 are each positioned about cams 42 and 44 and are attached to a first and a second attachment point 50 and 52, a cable axis X passing through both of the attachment points 50 and 52. The first tension cable 46 attaches at the first attachment point 50 on the first lower control arm 34, passes on a first side of the cable axis X, crosses over to an opposing second side of cable axis X, and attaches at a second attachment point 52. The second tension cable 48 attaches at the first attachment point 50, passes on the second side of cable axis X, crosses over to the first side of cable axis X, and attaches at the second attachment point 52. The tension cables 46 and 48 intersect at an intersection point 54. Although the cams 42 and 44 are described to be attached to lower control arms 34 and 36, it is to be understood that the cams 42 and 44 can also be attached to stabilizer bar links or the sub-frame of a vehicle.

Constant tension dampers 56 and 58, respectively, are employed on each of the tension cables 46 and 48. The tension dampers 56 and 58 react in response to tension applied to the respective tension cables 46 and 48 as the control arms 34 and 36 rotate about pivot points 38 and 40, respectively, in response to vehicle roll. The tension dampers 56 and 58 can be passive, semi-active or active.

Figure 3:
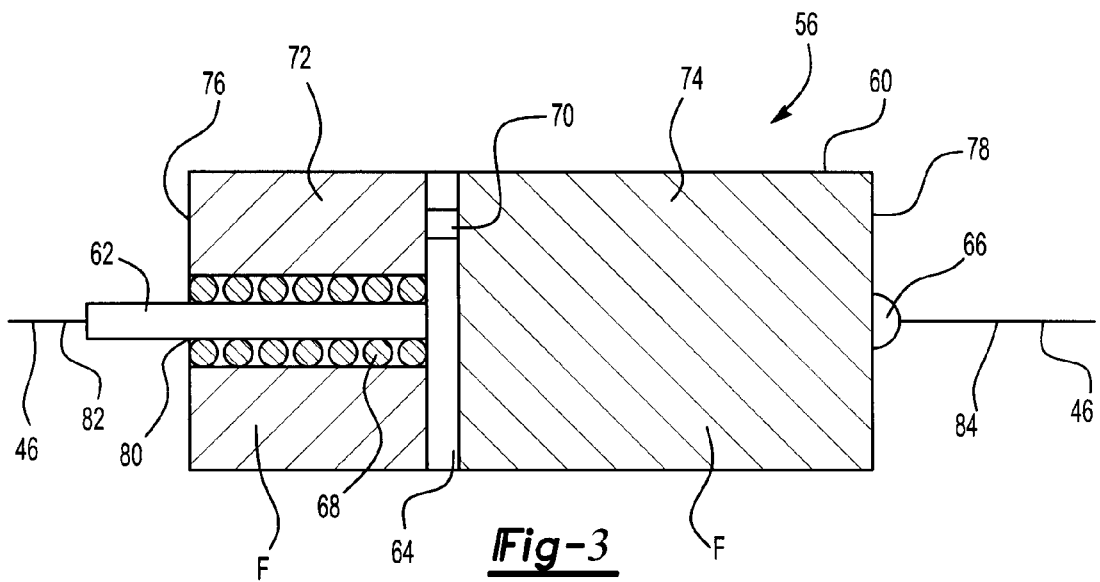
FIG. 3 illustrates a passive tension damper of the present invention.

A first embodiment of the tension damper 56 is illustrated in FIG. 3. The tension damper 56 includes a cylinder 60 and a piston 64 including at least one orifice 70 connected to a rod 62. The rod 62 is connected to a first end 82 of the tension cable 46. A second end 84 of the tension cable 46 is connected to an attachment link 66. Although only one orifice 70 is illustrated and described, it is to be understood that any number and any size of orifices 70 can be employed. The piston 64 separates the cylinder 60 into a first compartment 72 and a second compartment 74. Walls 76 and 78 seal the ends of the cylinder 60 to contain fluid F within the cylinder 60. Wall 76 includes a hole 80 through which rod 62 passes. A spring 68 is positioned on the rod 62 between the piston 64 and the wall 76. Although only tension damper 56 is described, tension damper 58 would be constructed in a similar manner.

As the vehicle turns and either control arm 34 or 36 rotates about pivot point 38 or 40, respectively, tension is applied to the respective tension cable 46 and 48. If the vehicle is turning and control arm 34 and cam 42 rotate about pivot point 38, cam 42 pulls on the first side 82 of tension cable 46. The first side 82 of the tension cable 48 pulls on the rod 62, pulling the piston 64 towards wall 76 and compressing spring 68. As fluid F is contained in the first compartment 72 of the cylinder 60, there is resistance to this movement. As the piston 64 is pulled towards wall 76, fluid F is directed from the first compartment 72 to the second compartment 74 through the orifice 70, damping vehicle roll. The greater the resistance to the movement of fluid F through the orifice 70, the higher the roll damping will be. When the vehicle levels and control arm 34 returns to the original position, spring 68 expands, returning piston 64 to the pre-turning position as illustrated in FIG. 3.

Figure 4:
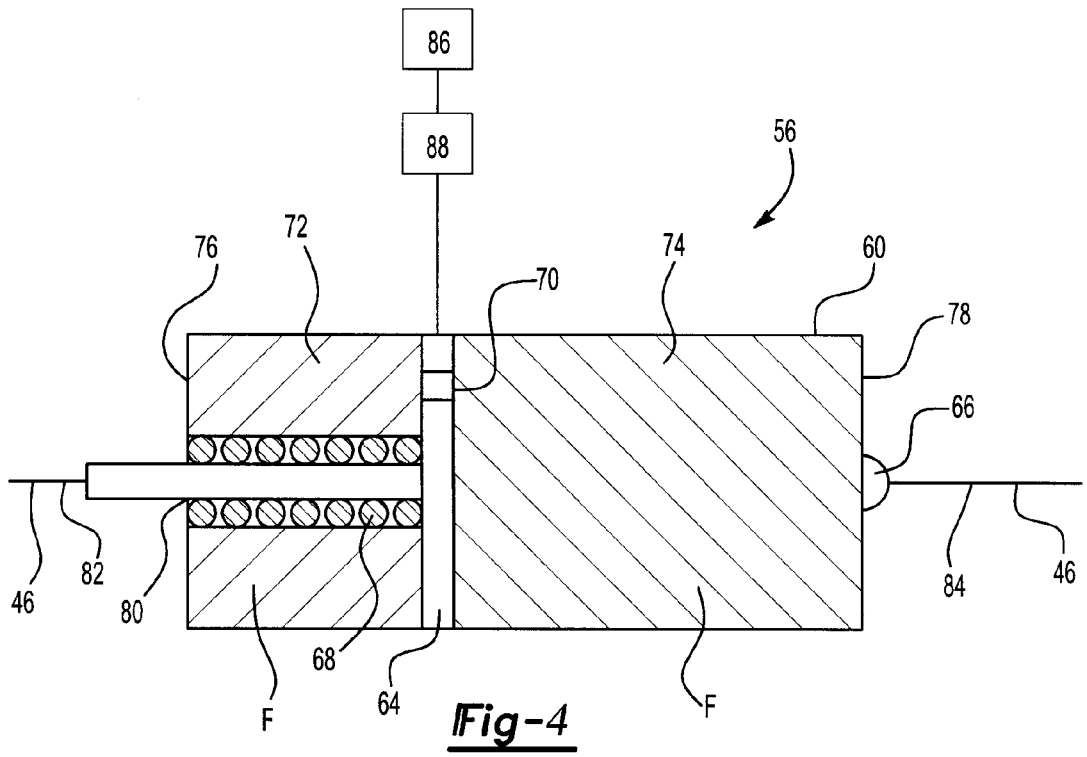
FIG. 4 illustrates a semi-active tension damper of the present invention.

FIG. 4 illustrates a semi-active tension damper 56. In this embodiment, the fluid F can be either electro-rheological or magnetic-rheological. A sensor 86, such as a yaw rate or steering rate sensor, senses vehicle roll. When the sensor 86 determines that the roll of the vehicle needs to be controlled, the sensor 86 applies either an electric or magnetic field to the electro-rheological fluid or magnetic-rheological fluid F, respectively, by a field source 88. The electric or magnetic field increases the viscosity of fluid F, further providing for vehicle roll damping. By changing the viscosity of the fluid F, the damping rate can be controlled. The structure 86 and 88 are shown schematically, but a work in this art would be able to provide the appropriate structure.

Figure 5:
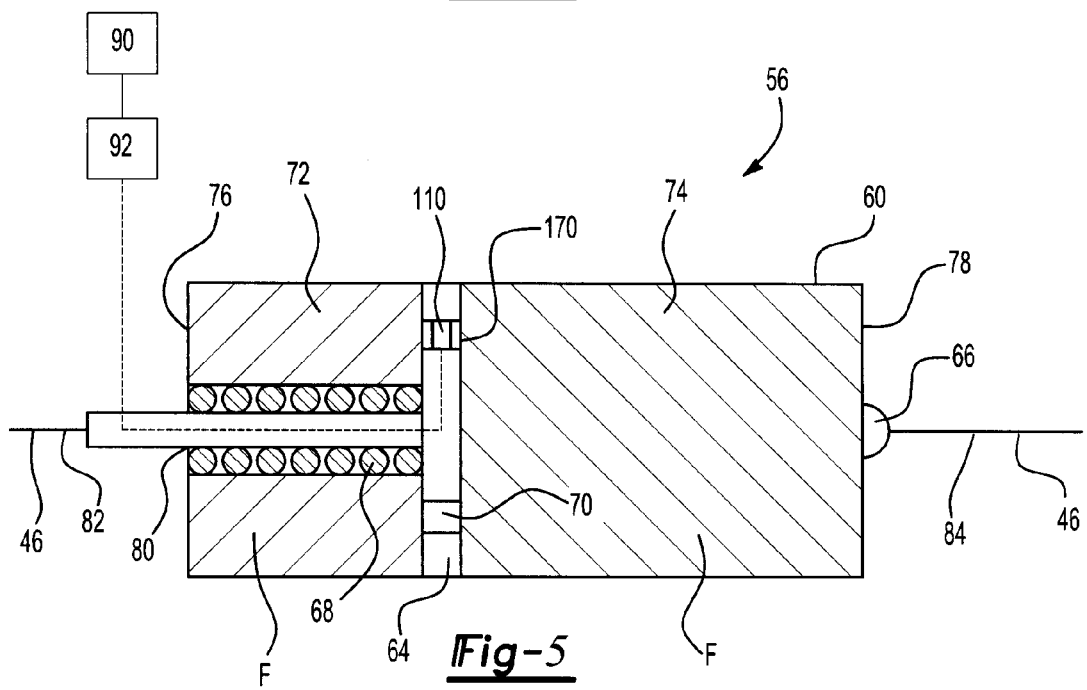
FIG. 5 illustrates an active tension damper of the present invention.

FIG. 5 illustrates an active tension damper 56. The vehicle roll damping is controlled by varying both the number and size of the orifices 70 in the piston 64. A sensor 90, such as a yaw rate or steering rate sensor, senses vehicle roll and activates the at least one orifice 70 based on these rates. As shown, a solenoid valve 110 is controlled by controller 92 to selectively open orifice 170. Another orifice 70 is shown fully open at all times. Thus, should less damping be needed, the controller 92 can open the solenoid 110 to allow fluid to flow through the passage 170, and the orifice 170 would work in addition to the orifice 70. Should more damping be needed, the solenoid 110 is closed blocking flow through the orifice 170. Rather than having an orifice which is completely opened or closed, incrementally opened or variable sized orifices could be utilized. By controlling the number and the size of the orifices 70, the damping rate of the vehicle can be controlled.

Alternatively, the sensors 86 and 90 can be used in a closed loop system. The sensors 86 and 90 monitor the rate of change of the suspension geometry and adjusts the fluid F viscosity and orifice size 70 accordingly to control the damping of vehicle roll. Additionally, a control algorithm can be used to further control the amount of roll allowed.

By using a vehicle suspension system 32 employing cams 42 and 44 and tension cables 46 and 48, vehicle roll can be dampened independent of the vertical damping. The vertical damping of the suspension is generally between 20% and 40% of the critical damping. By using the present invention, the damping of roll motion can be increased to a point relatively close to the critical damping, independent of vertical damping. Additionally, there is no "dead-band" in the suspension system as a counter-acting tension cable 48 remains loose when tension is applied to tension cable 46. Although a vehicle suspension 32 with a stabilizer bar 24 has been illustrated and described, it is to be understood that the present invention can also be employed in a vehicle suspension system without a stabilizer bar.

The present invention can be used in bicycles, motorcycles, automobiles, light trucks and commercial vehicles. The invention can also be used in other applications using tension, such as in commercial washing machines.

There are several advantages to using the vehicle suspension system 32 employing tension dampers 52 and 54 positioned on intersecting tension cables of the present invention. For one, a suspension using tension cables 46 and 48 is less expensive and lighter than the prior art suspensions. Additionally, the suspension system 32 of the present invention can maintain "zero dead-band" as the suspension rolls from one direction to the other. Finally, damping can be controlled relatively independently of the vertical damping.

Accordingly, the present invention provides a vehicle suspension system using tension dampers.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A vehicle suspension system comprising:
    a first pivotal suspension member and a second pivotable suspension member both attachable to a vehicle wheel;
    a cam attached to each of said first suspension member and said second suspension member;
    a pair of tension cables each attached to said first suspension member and said second suspension member, each of said pair of tension cables including tension cable portions; and
    a tension damper positioned between said tension cable portions of each of said pair of tension cables to viscously dampen said suspension system.

2. The vehicle suspension system as recited in claim 1 wherein said pair of tension cables intersect.

3. The vehicle suspension system as recited in claim 1 further including a first attachment point on said first suspension member a second attachment point on said second suspension member and a cable axis passing through said first attachment point and said second attachment point, and said pair of tension cables include a first tension cable, and a second tension cable and said first tension cable attaches to said first attachment point, passes on a first side of said cable axis, crosses over to an opposing second side of said cable axis, and attaches to said second attachment point, and said second tension cable attaches to said first attachment point, passes on said second side of said cable axis, crosses over to said first side of said cable axis, and attaches to said second attachment point.

4. The vehicle suspension system as recited in claim 1 wherein each of said tension dampers include a cylinder containing a fluid and a sliding piston attached to a rod, said piston including at least one orifice and said piston separates said cylinder into a first compartment and a second compartment, and tension in at least one of said pair of tension cable pulls said rod and said piston towards said first compartment, said fluid providing resistance to movement of said piston and said fluid passes through said orifice from said first compartment to said second compartment as said piston moves to viscously dampen said suspension system.

5. The vehicle suspension system as recited in claim 4 further including a spring positioned in said first compartment and around said rod, and tension in at least one of said pair of tension cables compresses said spring under said piston.

6. The vehicle suspension system as recited in claim 5 wherein said spring expands when said tension is removed from said tension cable to move said piston towards said second compartment.

7. The vehicle suspension system as recited in claim 4 further including a sensor that monitors at least one ride parameter and generates a signal based on said at least one ride parameter to control damping of said vehicle suspension system.

8. The vehicle suspension system as recited in claim 7 wherein said fluid is electro-rheological and changes viscosity in response to an electric field generated by said sensor.

9. The vehicle suspension system as recited in claim 7 wherein said fluid is magnetic-rheological and changes viscosity in response to a magnetic field generated by said sensor.

10. The vehicle suspension system as recited in claim 7 wherein said orifice has a diameter, and said diameter of said at least one orifice varies in response to said signal generated by said sensor.

11. The vehicle suspension system as recited in claim 1 wherein said pair of suspension members are lower control arms.

12. The vehicle suspension system as recited in claim 1 wherein said vehicle suspension system further includes a stabilizer bar.

13. A vehicle suspension system comprising:
    a first pivotable suspension member and a second pivotable suspension member attachable to a vehicle wheel;
    a stabilizer bar attached to each of said first suspension member and said second suspension member;
    a first cam and a second cam attached to said first suspension member and said second suspension member, respectively;
    a first tension cable and a second tension cable each including tension cable portions and each of said first tension cable and said second tension cable are attached to a first attachment point on said first suspension member and a second attachment point on said second suspension member, and a cable axis passes through said first attachment point and said second attachment point, said first tension cable attaches to said first attachment point, passes on a first side of said cable axis, crosses over to an opposing second side of said cable axis, and attaches to said second attachment point, and said intersecting second tension cable attaches to said first attachment point, passes on said second side of said cable axis, crosses over to said first side of said cable axis, and attaches to said second attachment point; and
    a tension damper positioned between said tension cable portions of said first tension cable and said tension cable portions of said second tension cable to viscously dampen said suspension system, each of said tension dampers including a cylinder containing a fluid, a sliding piston attached to a rod, said piston including at least one orifice and said piston separates said cylinder into a first compartment and a second compartment, and a spring positioned in said first compartment around said rod, tension in said tension cable pulling said rod and said piston towards said first compartment and said fluid providing resistance to the movement of said piston and passing through said orifice from said first compartment to said second compartment as said piston moves to provide damping.

14. The vehicle suspension system as recited in claim 13 further including a sensor that monitors at least one ride parameter and generates a signal based on said at least one ride parameter to control damping of said vehicle suspension system.

15. The vehicle suspension system as recited in claim 14 wherein said fluid is electro-rheological and changes viscosity in response to an electric field generated by said sensor.

16. The vehicle suspension system as recited in claim 14 wherein said fluid is magnetic-rheological and changes viscosity in response to a magnetic field generated by said sensor.

17. The vehicle suspension system as recited in claim 14 wherein said orifice has a diameter, and said diameter of said at least one orifice varies in response to a signal generated by said sensor.

18. A method for controlling damping of a vehicle suspension system comprising the steps of:

pivoting at least one suspension member including an attached cam;

increasing tension in at least one tension cable in response to the step of pivoting said at least one suspension member and said cam; and viscously damping said vehicle suspension system by adjusting said tension in said at least one tension cable.

19. The method for as recited in claim 18 further comprising the step of sensing a vehicle parameter to further control damping of said vehicle suspension system.

20. The method as recited in claim 18 wherein said at least one tension cable includes tension cable portions, and a viscous tension damper is positioned between said tension cable portions of said at least one tension cable.

* * * * *

UNITED STATES PATENT AND TRADEMARK OFFICE
CERTIFICATE OF CORRECTION

PATENT NO.   : 6,736,419 B2
DATED        : May 18, 2004
INVENTOR(S)  : Carlstedt et al.

It is certified that error appears in the above-identified patent and that said Letters Patent is hereby corrected as shown below:

Column 5,
Line 22, insert -- , wherein at least one of said tension cable portions contacs at least one of said cams -- after "portions" and before ";".

Column 6,
Line 38, insert -- , wherein at least one said tension cable portions contacts at least one of said cams -- after "attachment" and before ";".

Signed and Sealed this

Tenth Day of August, 2004

JON W. DUDAS
*Acting Director of the United States Patent and Trademark Office*